United States Patent
Siddegowda

(10) Patent No.: US 9,141,381 B2
(45) Date of Patent: Sep. 22, 2015

(54) VERSION CONTROL ENVIRONMENT FOR VIRTUAL MACHINES

(75) Inventor: Kishore Siddegowda, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 733 days.

(21) Appl. No.: 12/258,941

(22) Filed: Oct. 27, 2008

(65) Prior Publication Data

US 2010/0114825 A1 May 6, 2010

(51) Int. Cl.
*G06F 17/30* (2006.01)
*G06F 9/44* (2006.01)
*G06F 9/455* (2006.01)

(52) U.S. Cl.
CPC .............. *G06F 8/71* (2013.01); *G06F 9/45533* (2013.01)

(58) Field of Classification Search
CPC .................................. G06F 17/30; G06F 8/71
USPC ........ 707/600–899; 718/1; 717/168; 711/100
See application file for complete search history.

(56) References Cited

U.S. PATENT DOCUMENTS

| | | | |
|---|---|---|---|
| 2006/0184937 A1* | 8/2006 | Abels et al. ........................ | 718/1 |
| 2006/0218544 A1* | 9/2006 | Chakraborty et al. ........ | 717/168 |
| 2006/0225065 A1* | 10/2006 | Chandhok et al. ............ | 717/168 |
| 2007/0089111 A1* | 4/2007 | Robinson et al. ................. | 718/1 |
| 2008/0109804 A1* | 5/2008 | Bloomstein et al. .............. | 718/1 |
| 2008/0184225 A1* | 7/2008 | Fitzgerald et al. ............... | 718/1 |
| 2008/0215796 A1* | 9/2008 | Lam et al. ..................... | 711/100 |
| 2009/0300607 A1* | 12/2009 | Ferris et al. ....................... | 718/1 |

\* cited by examiner

*Primary Examiner* — Isaac M Woo

(57) ABSTRACT

A method of maintaining update history of a virtual machine (VM) is disclosed. The VM includes a version number. The method includes continuously monitoring a state of the VM. The monitoring of the state including detecting updates in configurations and applications of the VM. The changes in a status of the applications and the configuration are captured and metadata of the VM is updated when a change in the configurations or in the applications is detected. The version number of the VM is then incremented.

21 Claims, 5 Drawing Sheets

VERSION CONTROL ENVIRONMENT FOR VIRTUAL MACHINES

BACKGROUND

A Virtual Machine (VM) is generally stored in a self contained data file (VM file). For example, a VMware™ virtual machine is stored in a virtual machine disk (VMDK) file. This is a virtual disk file, which stores the content of a virtual machine's hard disk drive. A virtual disk is made up of one or more VMDK files. This VM data file can be used by virtualization systems to launch or run a virtual machine. When executing, a virtual machine can be modified by way of installing new applications, removing applications, amending configurations, etc.

Generally, numerous incremental updates would be applied on top of a base version of a virtual machine. However, the virtual machine file metadata does not maintain these incremental changes. With the growth of virtualization, hundreds or thousands of virtual machine files may be in existence in a typical data center. Since a virtual machine file doesn't provide metadata to indicate what applications are installed and what the update history of the virtual machine is, it is difficult to manage this large volume of virtual machine files. Hence, it is within the context this invention arises.

SUMMARY

In one embodiment, a method of maintaining update history of a virtual machine (VM) is disclosed. The VM has a version number. The state of the VM is continuously monitored. The monitoring of the state including detecting updates in configurations and applications of the VM. The changes in the status of the applications and the configurations are captured and metadata of the VM is stored in an external file when a change in the configurations or the applications is detected. The version number of the VM is then incremented.

In another embodiment, a method of maintaining update history of a virtual machine (VM) is disclosed. The VM includes a version number. The method includes continuously monitoring a state of the VM. The monitoring of the state including detecting updates in configurations and applications of the VM. The changes in a status of the applications and the configuration are captured and metadata of the VM is updated when a change in the configurations or in the applications is detected. The version number of the VM is then incremented.

In yet another embodiment, a computer readable media to store programming instructions for maintaining an update history of a virtual machine (VM) is disclosed. The VM has a version number. The computer readable media includes programming instructions for continuously monitoring a state of the VM. The monitoring of the state including detecting updates in configurations and applications of the VM. The computer readable media further includes programming instructions for capturing changes in a status of the applications and the configurations and programming instructions for storing metadata of the VM in an external file when a change in the configurations or the applications is detected. The computer readable media also includes programming instructions for incrementing the version number of the VM.

DETAILED DESCRIPTION

A number of virtual machines in a typical data center may grow into hundreds or thousands. Since virtual machine (VM) files are typical binary files and stored in a file system, managing these files and efficiently using them becomes a bottleneck as these files do not contain enough metadata information to provide, among other things, a list of installed applications, current configuration, and the incremental update history of the changes made to a particular VM file.

Figures 1, 2:
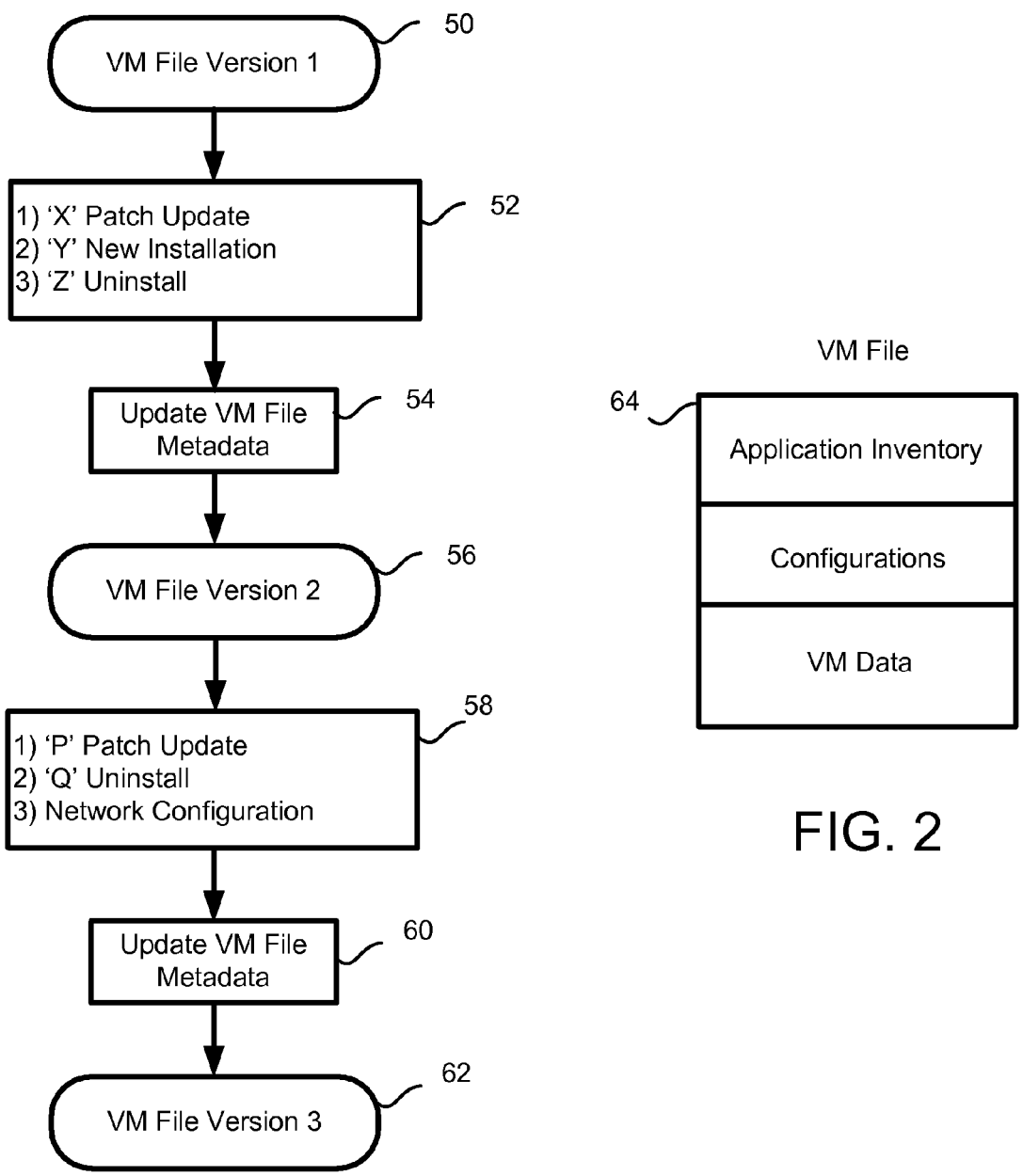
FIG. 1 illustrates a process of maintaining update history in a virtual machine (VM) file in accordance with one or more embodiments of the present invention.
FIG. 2 illustrates an exemplary structure of a VM file in accordance with one or more embodiments of the present invention.

FIG. 1 illustrates a process of maintaining a update history of the incremental changes in a VM file. The process starts with a VM file version 1 at step 50. An inventory of the installed application is taken and stored in the metadata section of the VM file. In one embodiment, the current configurations and settings are also captured and stored in the file metadata. At step 52, one or more softwares in the VM are updated, a new application is installed and an existing application is uninstalled. In one embodiment, the configurations are backed up to enable a smooth restoration to a previous state.

At stem 54, the VM file metadata is updated and at step 56 the version of the VM file is incremented. Steps 58, 60 and 62 repeat steps 52, 56, and 58 respectively and in that sequence.

In one embodiment, the VM file metadata is maintained within the VM file itself. In another embodiment, the VM file metadata is maintained outside of the VM file with one or more pointers pointing to one or more versions of VM files in the file system.

FIG. 2 illustrates an exemplary VM file data structure 64. In one or more embodiments, the VM file data structure 64 includes storage for a list of installed applications, storage for VM configurations and storage for VM data. The VM data section stores data that a virtualization system (such as a hypervisor) uses to launch a VM.

Figure 3:
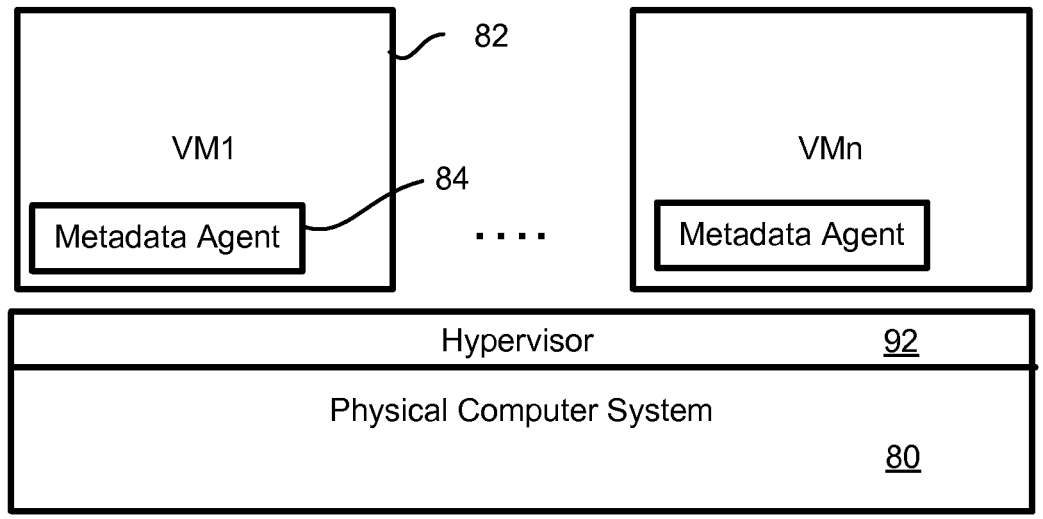
FIG. 3 illustrates virtual machines executing in a physical computing system and metadata agents executing within these virtual machines in accordance with one or more embodiments of the present invention.

FIG. 3 illustrates a simplified view of a virtualization system, which includes a virtualization software (e.g., hypervisor) 92 executing in a physical computer system 80. Note that other virtualization configurations are available and well known. However, much details are being omitted as it is not necessary for the understanding of the embodiment of the present invention.

FIG. 3 also illustrates a plurality of virtual machines executing on top of the virtualization software 92. VM1 82 includes a metadata agent 84. Metadata agent 84 runs inside VM1 82 to collect application inventory, configuration data and other relevant metadata, including the changes in metadata when VM1 is running.

Figure 4:
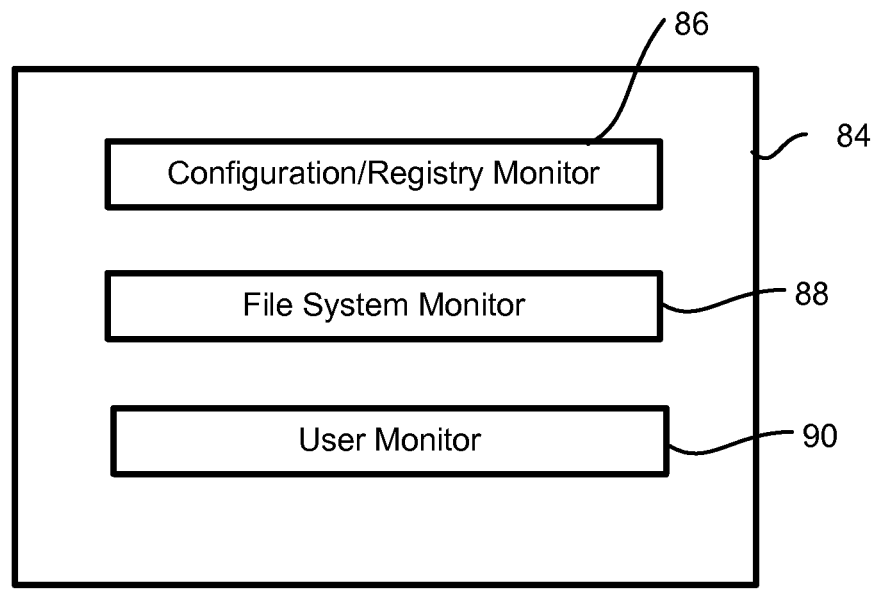
FIG. 4 illustrates an exemplary structure of a metadata agent in accordance with one or more embodiments of the present invention.

FIG. 4 illustrates an exemplary structure of metadata agent 84. In one or more embodiments, metadata agent 84 includes a configuration/registry monitor 84 to track changes in system or application configurations during a runtime session of a VM. File System Monitor 88 is included to monitor changes in the system and/or application files in the file system of a VM during a runtime session of the VM. User Monitor 90 is included to monitor additions, deletions, updates in user profiles, including the changes in authentication and authorization settings of each user in a VM.

Figure 5:
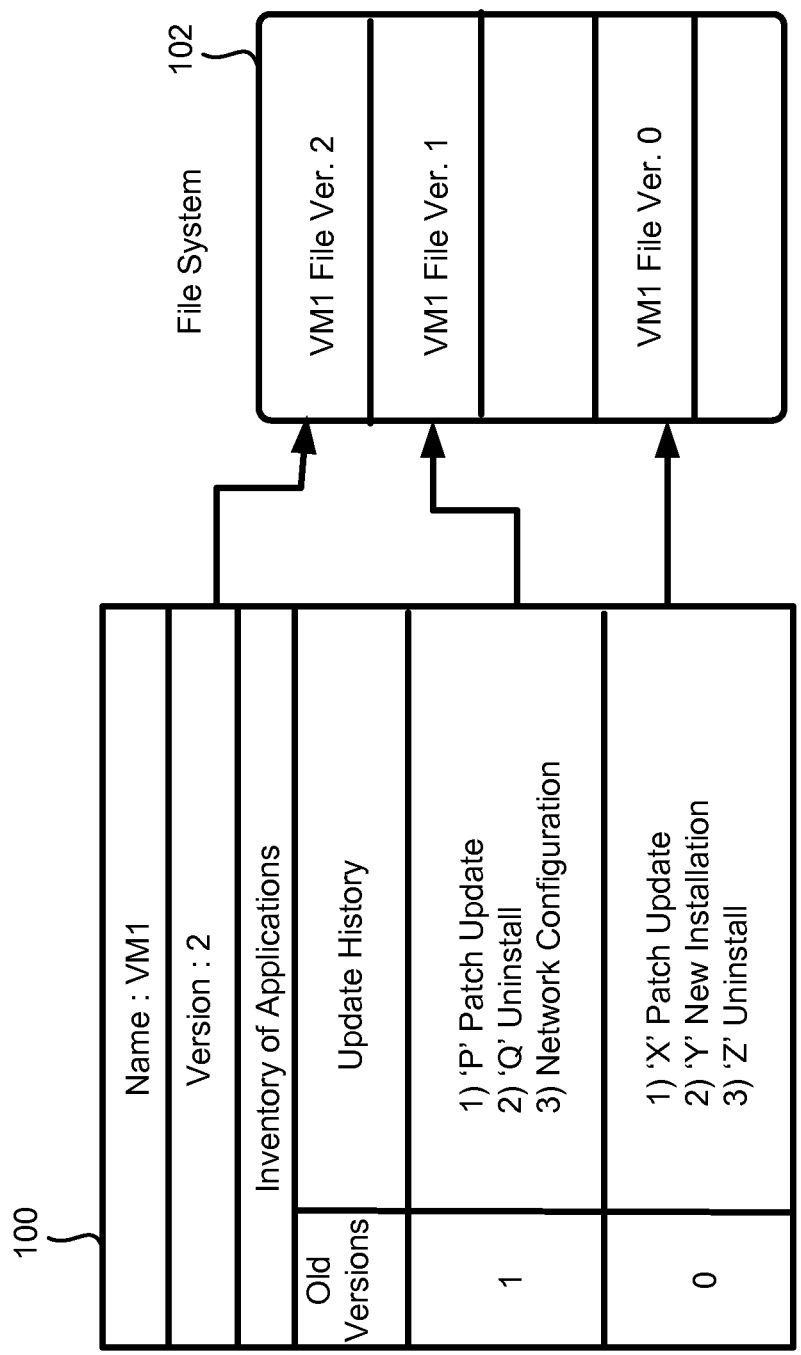
FIG. 5 illustrates an exemplary structure of a VM file metadata storage in accordance with one or more embodiments of the present invention.

FIG. 5 illustrates a VM metadata file 100 to store the VM metadata information outside of a VM file. In this embodiment, existing VM files may be used without any structural modification in their file data structure. A metadata agent can be configured to track the updates in a VM and write those updates in an external metadata file.

In one or more embodiments, Metadata file 100 includes inventory of applications in the current version of a VM and information about the incremental updates in the VM. In one or more embodiments, Metadata file 100 also includes one or more pointers to file system 102 where various versions of the VM file are stored. In one embodiment, after the VM is updated, a snapshot is taken and the output file is stored in the file system 102. The version number of the current VM file is then incremented. The process of taking snapshots of virtual machines is a well known art.

In one or more embodiments, the snapshots are taken at configurable intervals. For example, a snapshot can be taken at the completion of every VM update action. In another example, a snapshot is taken after a plurality of update actions within a certain time period. For example, the system can be configured to take a snapshot every six years, if there was a software or configuration update during this period of time.

In one or more embodiments, a metadata viewer is provided to enable a user to view the content of a VM and the associated incremental update history. In one or more embodiments, an interface to standard version control systems is provided to enable a user to manage various versions of a VM file. Generally, these version or source control systems expose integration interfaces, which can be implemented to supply metadata of a VM file to the version control system. This process is well known in the art; hence a detailed discussion is being omitted.

Figure 6:
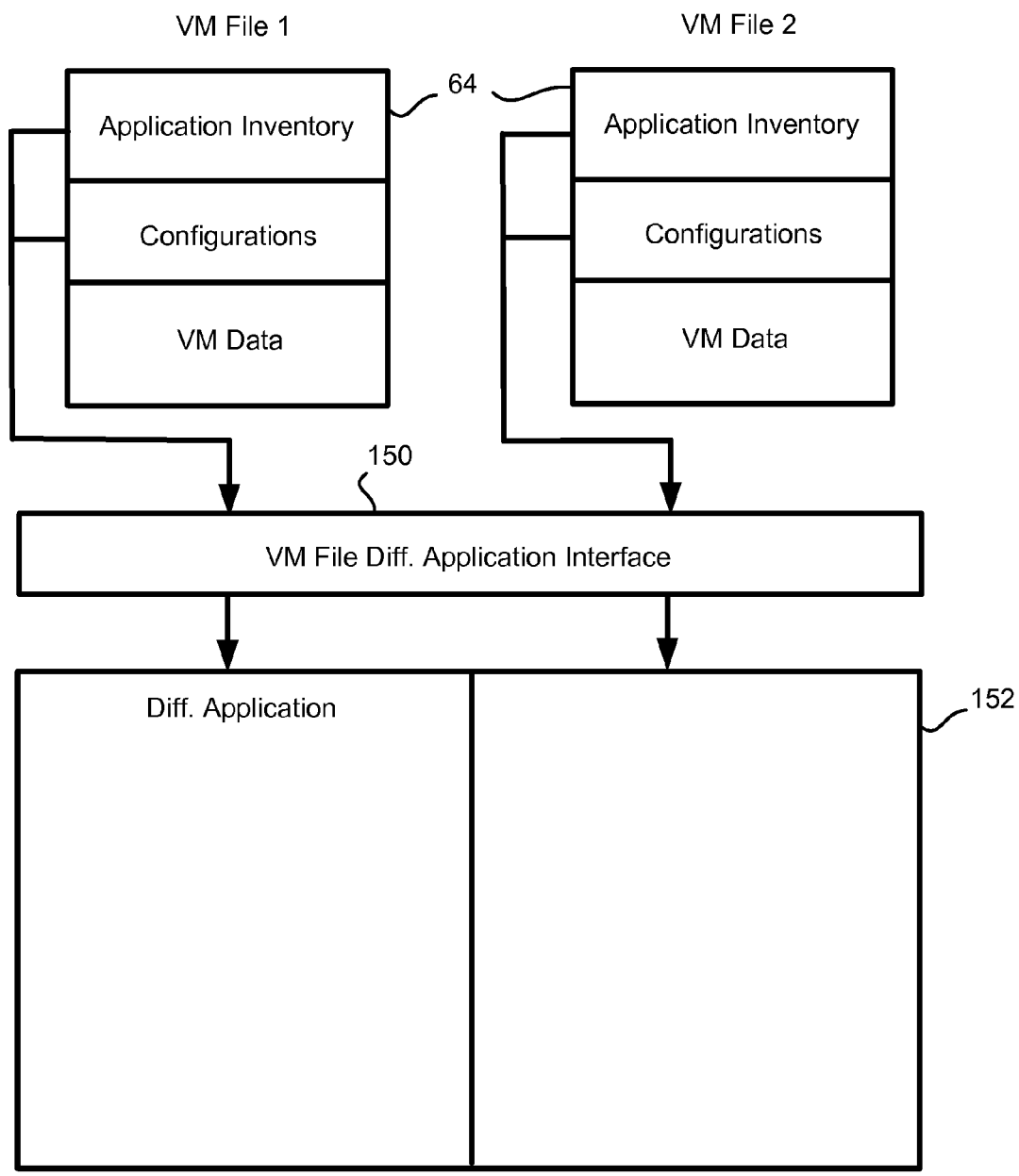
FIG. 6 illustrates an exemplary system of displaying differences between two selected versions of a VM file with the metadata embedded within in accordance with one or more embodiments of the present invention.

A typical version/source code control system provides a diff. functionality to enable a user to visually view the differences between two versions of a file. FIG. 6 illustrates providing a VM File Diff Application Interface 150 to a VM file 64 that also includes the update history and version information. Since a VM file is a complex binary file, which may not be read by a typical version control system (because the version control system is unaware of the data structure of this binary file), VM File Diff Application Interface 150 harmonizes the data transfer from the VM file to Diff Application 152 of a typical version control system. In one or more embodiment, VM File Diff Application Interface 150 reads application inventory and configuration sections of a VM file and present the data therein in a format that is suitable for Diff. Application 152.

In one or more embodiments, a typical source/version control system can be employed to provide a secure mechanism for changing VM configurations through check-outs and check-ins to VM files. Through check-out/check-in, a system administrator can keep track of changes review configuration changes between different versions of VM files. Configuration changes can include additions/deletions/modifications of different system components such as virtual disks, virtual network interfaces etc.

Figure 7:
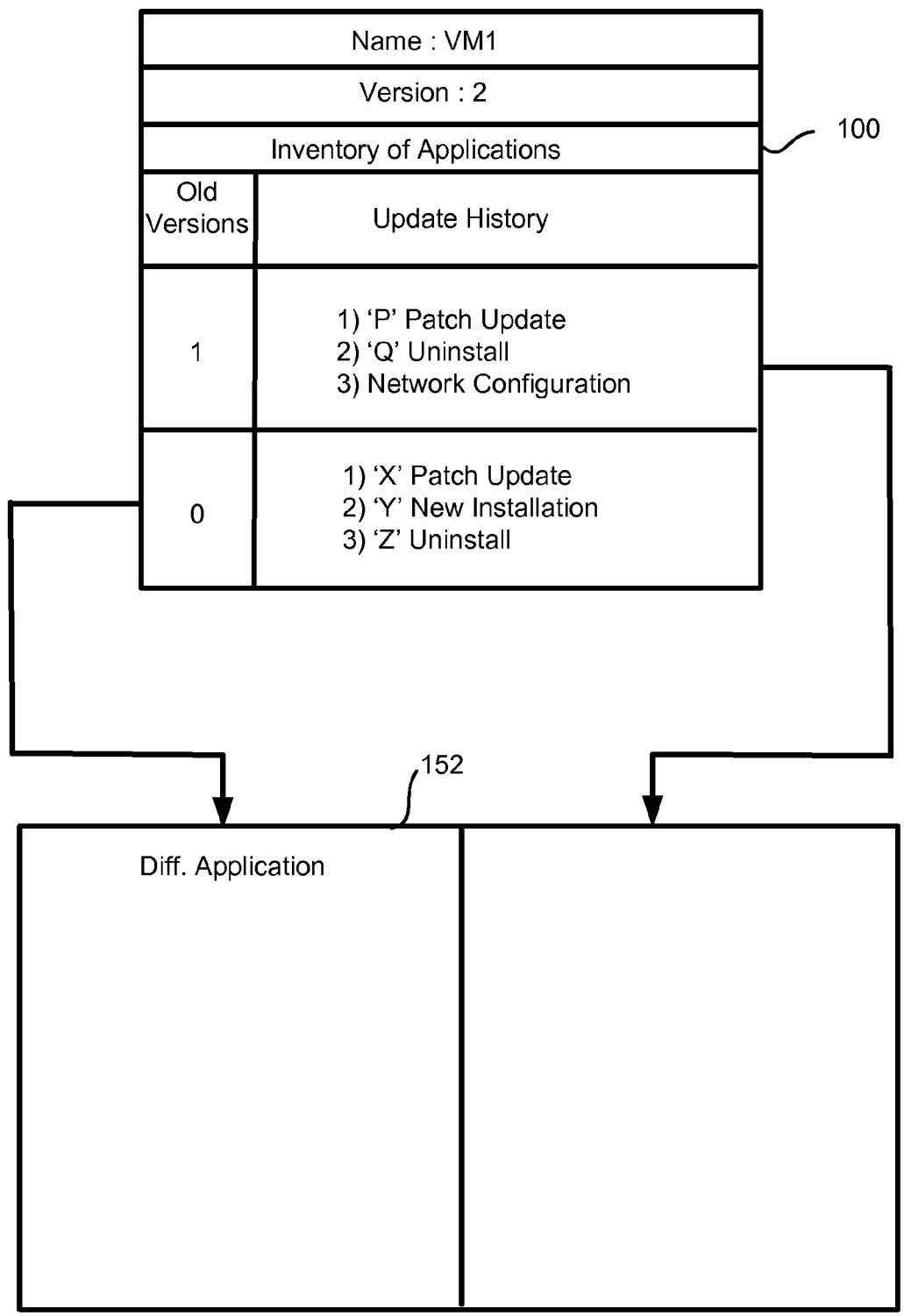
FIG. 7 illustrates an exemplary system of displaying differences between two selected versions of a VM file with the metadata embedded in an external VM metadata file in accordance with one or more embodiments of the present invention.

FIG. 7 illustrate interfacing of a VM metadata file 100 with a Diff Application 152 of a version control system. In one embodiment, VM metadata file 100 is maintained in a simple text format. Hence, Diff. Application 152 can read this file and display the data in a proper format. However, if VM metadata file 100 is being maintained in a complex format, a VM File Diff Application Interface as described in FIG. 6 may be implemented to provide metadata to Diff. Application 152 in a proper format.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of maintaining update history of a virtual machine (VM), the VM having a version number, the method comprising:
   continuously monitoring a state of the VM, the monitoring of the state including detecting updates in configurations and applications of the VM;
   capturing changes in a status of the applications and the configurations;
   updating metadata of the VM when a change in the configurations or the applications is detected, the metadata of the VM having the update history of the VM that includes a previous version number of the VM and at least one change in the configuration and the applications of the VM corresponding to the previous version number of the VM; and
   incrementing the version number of the VM in response to the change in the configurations or the applications being detected,
   wherein at least one of the continuously monitoring, the capturing, the updating and the incrementing is executed by a computer system.

2. The method as recited in claim 1, wherein the metadata being stored in a VM file, the VM file is an operating system file that stores content of a hard disk drive of the VM, the VM file includes data sections to store application inventory and the configurations for the VM, the VM file is a file system file that stores the VM including state information, wherein a virtualization software uses the VM file to launch the VM.

3. The method as recited in claim 1, wherein the continuous monitoring is being performed by a metadata agent, the metadata agent includes a configuration monitor.

4. The method as recited in claim 3, wherein the metadata agent further including a file system monitor to monitor changes in the applications.

5. The method as recited in claim 4, wherein the metadata agent further including a user monitor to capture changes in users of the VM including capturing changes in privileges of the users.

6. The method as recited in claim 1, further including:
   interfacing with a diff. application to enable comparison of content of two versions of the VM file.

7. The method as recited in claim 1, wherein the incrementing includes incrementing the version number of the VM after each updating of the metadata of the VM.

8. The method as recited in claim 1, wherein the metadata of the VM includes at least one pointer to a file system where a previous version of the VM file is stored.

9. The method as recited in claim 8, further comprising taking a snapshot of the VM after the VM is updated and storing the snapshot in the file system.

10. A method of maintaining update history of a virtual machine (VM), the VM having a version number, the method comprising:
    continuously monitoring a state of the VM, the monitoring of the state including detecting updates in configurations and applications of the VM;
    capturing changes in a status of the applications and the configurations;
    storing metadata of the VM in an external file that is outside of a VM file when a change in the configurations or the applications is detected, the metadata of the VM having the update history of the VM that includes a previous version number of the VM and at least one change in the configuration and the applications of the VM corresponding to the previous version number of the VM, the VM file being a file system file that stores the VM including state information, the VM file being configured to be used by a virtualization software to launch the VM; and
    incrementing the version number of the VM,
    wherein at least one of the continuously monitoring, the capturing, the storing and the updating is executed by a computer system.

11. The method as recited in claim 10, wherein the external file includes at least one pointer to one or more versions of the VM file, each of the versions being associated with a change log.

12. The method as recited in claim 11, wherein the change log includes the changes in the status of the applications and the configurations with respect to a previous version of the VM file.

13. The method as recited in claim 12, further including an interface to a version control system to enable check-out and check-in of the external file.

14. The method as recited in claim 10, wherein the incrementing includes incrementing the version number of the VM in response to the change in the configurations or the applications being detected.

15. A computer readable media to store programming instructions for maintaining an update history of a virtual machine (VM), the VM having a version number, the computer readable media comprising:
    programming instructions for continuously monitoring a state of the VM, the monitoring of the state including detecting updates in configurations and applications of the VM;
    programming instructions for capturing changes in a status of the applications and the configurations;

programming instructions for storing metadata of the VM in an external file that is outside of a VM file when a change in the configurations or the applications is detected, the metadata of the VM having the update history of the VM that includes a previous version number of the VM and at least one change in the configuration and the applications of the VM corresponding to the previous version number of the VM, the VM file being a file system file that stores the VM including state information, the VM file being configured to be used by a virtualization software to launch the VM; and programming instructions for incrementing the version number of the VM.

16. The computer readable media as recited in claim 15, wherein the external file includes at least one pointer to one or more versions of the VM file, each of the versions being associated with a change log.

17. The computer readable media as recited in claim 16, wherein the change log includes the changes in the status of the applications and the configurations with respect to a previous version of the VM file.

18. The computer readable media as recited in claim 16, further including programming instruction to provide an interface to a version control system to enable check-out and check-in of the external file.

19. The computer readable media as recited in claim 15, wherein the programming instructions for continuously monitoring a state of the VM including programming instructions for monitoring changes in the configurations of the VM.

20. The computer readable media as recited in claim 15, wherein the programming instructions for continuously monitoring a state of the VM including programming instructions for monitoring changes in the applications of the VM.

21. The computer readable media as recited in claim 15, wherein the programming instructions for incrementing the version number of the VM includes programming instructions for incrementing the version number of the VM in response to the change in the configurations or the applications being detected.

* * * * *